United States Patent
Bolle et al.

(10) Patent No.: US 6,870,300 B2
(45) Date of Patent: Mar. 22, 2005

(54) MICRO-ELECTRICAL-MECHANICAL SYSTEM (MEMS) DEVICE HAVING A PLURALITY OF PAIRS OF REFLECTIVE ELEMENT ACTUATORS LOCATED ON OPPOSING SIDES OF A REFLECTIVE ELEMENT AND A METHOD OF MANUFACTURE THEREFOR

(75) Inventors: Cristian A. Bolle, Bridgewater, NJ (US); Edward Chan, Sunnyvale, CA (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 189 days.

(21) Appl. No.: 10/001,182

(22) Filed: Dec. 1, 2001

(65) Prior Publication Data

US 2005/0029902 A1 Feb. 10, 2005

(51) Int. Cl.[7] .................. G02B 26/08; G02B 26/10; H02N 1/00

(52) U.S. Cl. .................. 310/309; 385/18; 359/223; 359/224

(58) Field of Search .................. 310/309; 359/223, 359/224, 290, 291; 385/16, 18, 22

(56) References Cited

U.S. PATENT DOCUMENTS

| 5,729,075 | A | * | 3/1998 | Strain | 310/309 |
| 5,875,271 | A | * | 2/1999 | Laughlin | 385/16 |
| 5,920,417 | A | | 7/1999 | Johnson | 359/223 |
| 5,959,760 | A | * | 9/1999 | Yamada et al. | 359/224 |
| 6,657,759 | B2 | * | 12/2003 | Muller | 359/198 |

* cited by examiner

Primary Examiner—Karl Tamai

(57) ABSTRACT

A micro-electrical-mechanical system (MEMS) device and a method of manufacture therefor. The micro-electrical-mechanical system includes a reflective element and a reflective element actuator located adjacent a perimeter of the reflective element and outside a path of motion of the reflective element.

28 Claims, 16 Drawing Sheets

MICRO-ELECTRICAL-MECHANICAL SYSTEM (MEMS) DEVICE HAVING A PLURALITY OF PAIRS OF REFLECTIVE ELEMENT ACTUATORS LOCATED ON OPPOSING SIDES OF A REFLECTIVE ELEMENT AND A METHOD OF MANUFACTURE THEREFOR

CROSS-REFERENCE TO RELATED APPLICATIONS

This application is related to the following U.S. patent application Ser. No. 09/755,727 filed on Jan. 5, 2001, and entitled "ELECTROSTATICALLY ACTUATED MICRO-ELECTRO-MECHANICAL SYSTEM (MEMS) DEVICE" to Vladimir A. Aksyuk, et al. The above-listed application is commonly assigned and co-pending with the present invention, and is incorporated herein by reference as if reproduced herein in its entirety.

TECHNICAL FIELD OF THE INVENTION

The present invention is directed, in general, to optical devices and, more specifically, to a micro-electrical-mechanical system (MEMS) device and a method of manufacture therefor.

BACKGROUND OF THE INVENTION

Electrostatically actuated micro-electrical-mechanical system (MEMS) devices have been proposed for a variety of applications. One promising use for MEMS devices is in optical switching and steering devices. In such devices, movable micromachined mirrors are used as switching elements to direct input optical signals to desired outputs. The movement of the micromachined mirrors is accomplished by electrostatic actuation.

In a typical MEMS device, an individual mirror is affixed to a movable support structure (i.e., a gimbal) via torsional elements such as springs. The gimbal may be coupled to a frame, also via torsional elements. Typically, two torsional elements positioned on opposing sides of the mirror, couple the mirror to the gimbal, and define an axis for mirror rotation. Similarly, two torsional elements positioned on opposing sides of the gimbal, couple the gimbal to the frame, and may define an axis for gimbal rotation.

In a conventional device, electrodes are positioned under the mirror and gimbal. The electrodes are configured to rotate the mirror or gimbal in either direction about its axis. The mirror or gimbal rotates under the electrostatic force between the mirror and gimbal, and is balanced in equilibrium by the restoring force of the torsional elements. The degree of rotation depends upon the amount of voltage applied to the electrodes. Traditionally, a degree of rotation up to about 9 degrees is achievable. However, with the above-mentioned designs, a voltage of greater than about 150 volts may be required.

One disadvantage with the traditional switching element disclosed above is that large gaps between the mirror and the electrodes are needed for large-angle tilting. Because the electrodes are positioned under the mirror for operation, the electrodes must be positioned having a gap large enough that a desired tilt angle may be achieved. Additionally, the larger the mirror used, the larger the gap required. As a result of the varying tilt angles and resulting mirror placement, the device has to be made up of separate mirror and electrode components, which may be assembled manually. This is typically a tedious and expensive process and introduces additional room for error to occur. More importantly, because of the distance needed between the mirror and the electrodes for large-angle tilting, a higher actuation voltage may be required to operate the MEMS devices. This higher voltage requirement adversely affects the controllability of the device and, of course, increases power requirements of the device that is intended to function on as low a voltage as possible.

Another disadvantage with the traditional switching element disclosed above is that the electrodes are positioned within a path of motion of the mirror. In such situations it is possible for the mirror to physically contact the electrodes, possibly causing the lifetime of the device to diminish.

SUMMARY OF THE INVENTION

To address the above-discussed deficiencies of the prior art, the present invention provides a micro-electrical-mechanical system (MEMS) device. The micro-electrical-mechanical system includes a reflective element and a reflective element actuator located adjacent a perimeter of the reflective element and outside a path of motion of the reflective element.

The present invention is further directed to a method of manufacturing the micro-electrical-mechanical system. The method, in an exemplary embodiment, includes (1) forming a reflective element, and (2) forming a reflective element actuator adjacent a perimeter of the reflective element and outside a path of motion of the reflective element. Also provided by the present invention is an optical communications system. The optical communications system, in a preferred embodiment, includes input/output fiber bundles in addition to the micro-electrical-mechanical system.

BRIEF DESCRIPTION OF THE DRAWINGS

The invention is best understood from the following detailed description when read with the accompanying FIGUREs. It is emphasized that in accordance with the standard practice in the optoelectronic industry, various features may not be drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
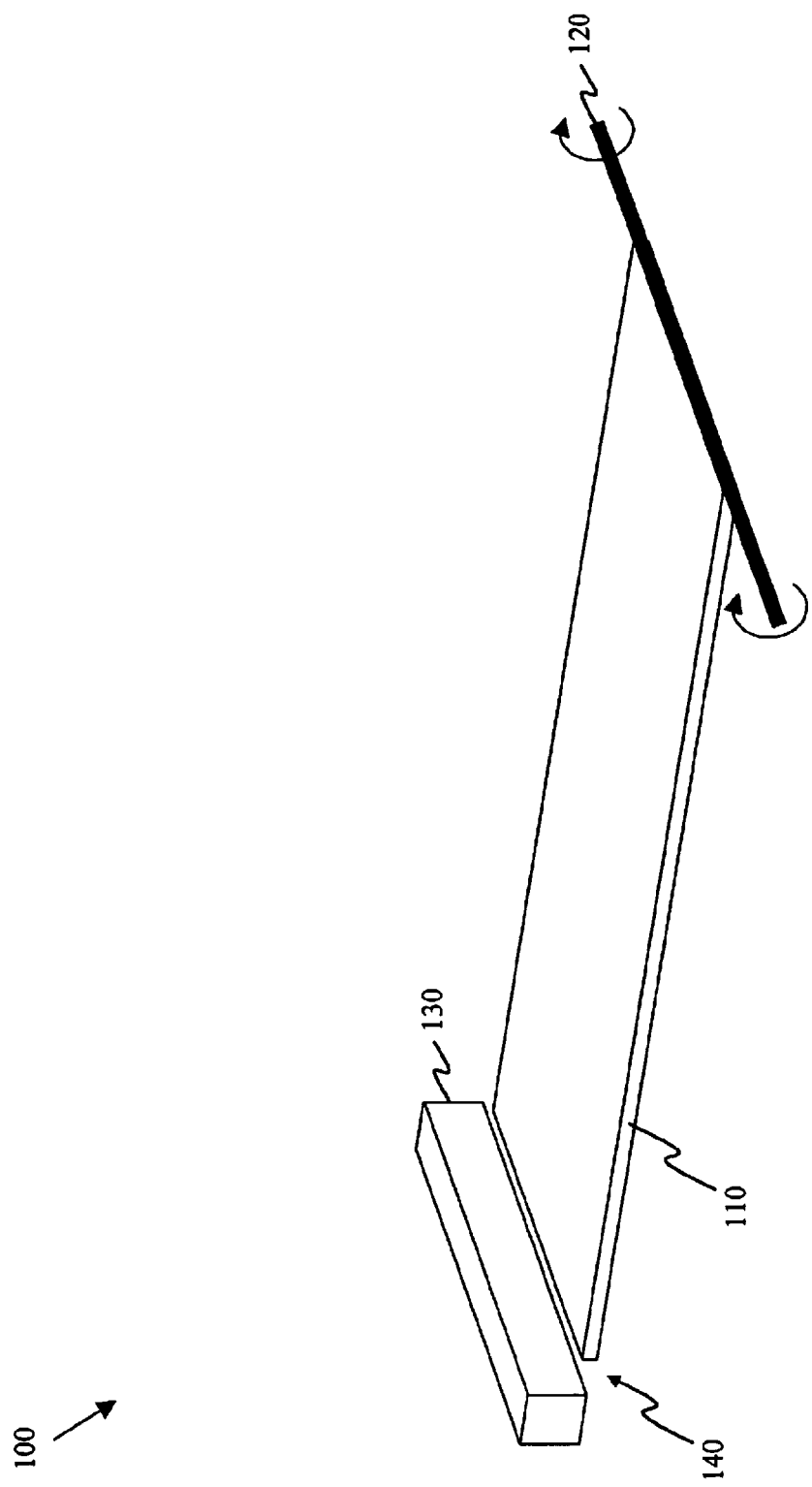
FIG. 1 illustrates a 3-dimensional view of, one embodiment of a micro-electrical-mechanical system (MEMS) device, constructed according to the principles of the present invention.

Referring initially to FIG. 1, illustrated is a 3 dimensional view of one embodiment of a micro-electrical-mechanical system (MEMS) device 100, constructed according to the principles of the present invention. The MEMS device 100 includes a reflective element 110 rotatably coupled to a torsional rod 120. The MEMS device 100 further includes a reflective element actuator 130, such as an electrode, located adjacent a perimeter of the ski reflective element 110 and outside a path of motion of the reflective element 110, which is indicated about the circular arrows about the torsional rod 120. The term "path of motion," as used throughout the remainder of the document, means any path the reflective element 110 might encounter while being completely rotated in one direction or another. The term "outside of a path of motion" means any area that would typically not be encountered by the reflective element 110 during rotation thereof. The term "adjacent a path of motion," means any area that is outside the path of motion, but proximate the path of motion.

The reflective element actuator 130 is configured to cause the reflective element 110 to rotate about the torsional rod 120 when an electrical potential is applied to the reflective element actuator 130. It should initially be noted that while all of the following embodiments will illustrate MEMS devices having one axis of rotation, it should be understood that it is also within the scope of the present invention to use multi-axis rotation MEMS devices.

In the embodiment shown in FIG. 1, the MEMS device 100 includes a single reflective element actuator 130 positioned adjacent a tip 140 of the reflective element 110. It should be noted, and will be shown in subsequent FIGURES, that the number and position of the reflective element actuators 130, may vary. In an exemplary embodiment of the present invention, a lateral gap 140 between the reflective element actuator 130 and the reflective element 110 may range from about 2 μm to about 6 μm, while continuing to tilt the reflective element 110 a desired number of degrees. This is in direct contrast to certain conventional MEMS devices, wherein a lateral gap between the electrodes and the mirror surface might range from about 10 μm to about 20 μm, to obtain the same degree of tilt. This degree of distance is required by conventional devices to achieve the desired degree of tilt while preventing contact of the reflective element with the electrode. Due to the unique configuration provided by the present invention, the gap 140 can be much smaller, thereby reducing operating voltages.

Figure 2:
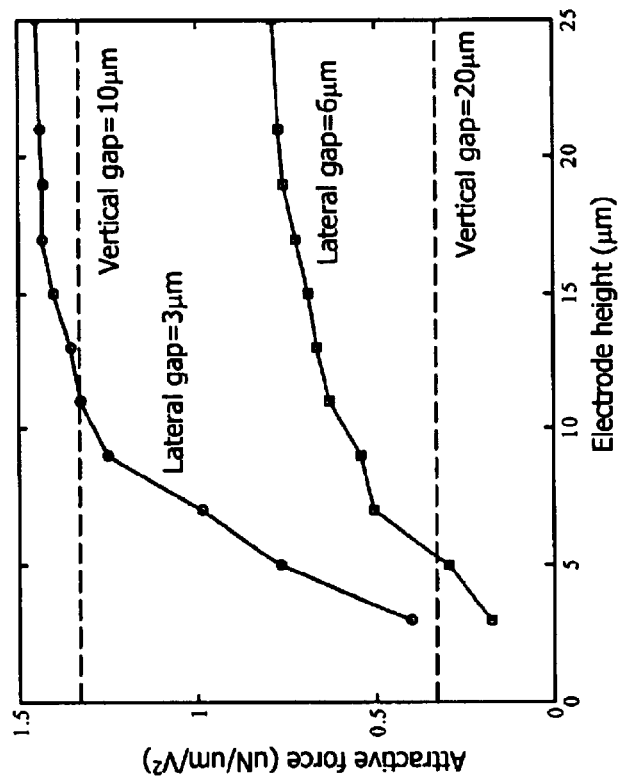
FIG. 2 illustrates a graph representing attractive force versus reflective element actuator height, for a MEMS device using lateral displacement of the reflective element actuators as compared to the Prior Art MEMS device using electrodes placed vertically under the mirror surface.

Turning briefly to FIG. 2, illustrated is a graph representing attractive force versus reflective element actuator height, for the MEMS device 100 using lateral displacement of the reflective element actuators, as compared to a conventional MEMS device using electrodes placed vertically under the mirror surface. It should initially be noted, and as was previously mentioned, that the vertical placement of the electrodes in conventional MEMS devices are dependent on a desired tilt angle. Thus, if the conventional MEMS device desires to substantially increase the tilt angles, the vertical placement must also be increased. Such a a substantial increase might be from the traditional vertical placement of about 10 μm to an increased vertical placement of about 20 μm. It should further be noted that the height of the electrodes, if placed vertically under the mirror surface, does not provide any additional attractive force, as shown in FIG. 2.

As can be noticed in FIG. 2, a lateral gap of about 3 μm can provide an attractive force greater than a vertical gap of 10 μm, often found in conventional devices. The difference is even more pounced when comparing a lateral gap of about 6 μm and a vertical gap of about 20 μm, as required for some large tilt angle devices. Note, however, that it is difficult to compare the MEMS device 100 provided by the preset invention and the conventional MEMS device, because effectiveness depends on the shape of the moveable part. For large, single axis reflective elements 110, the reflective element actuators 130 are at least as effective as the conventional electrodes because of the ample periphery where the reflective element actuators 130 may be placed. It can further be noticed by the graph 200 illustrated in FIG. 2, the attractive upwards force increases with increasing reflective element actuator height 130, until it saturates at around 15 μm. Thus, in an exemplary embodiment, the reflective element actuator 130 may have a height up to about 15 μm.

Figure 3:
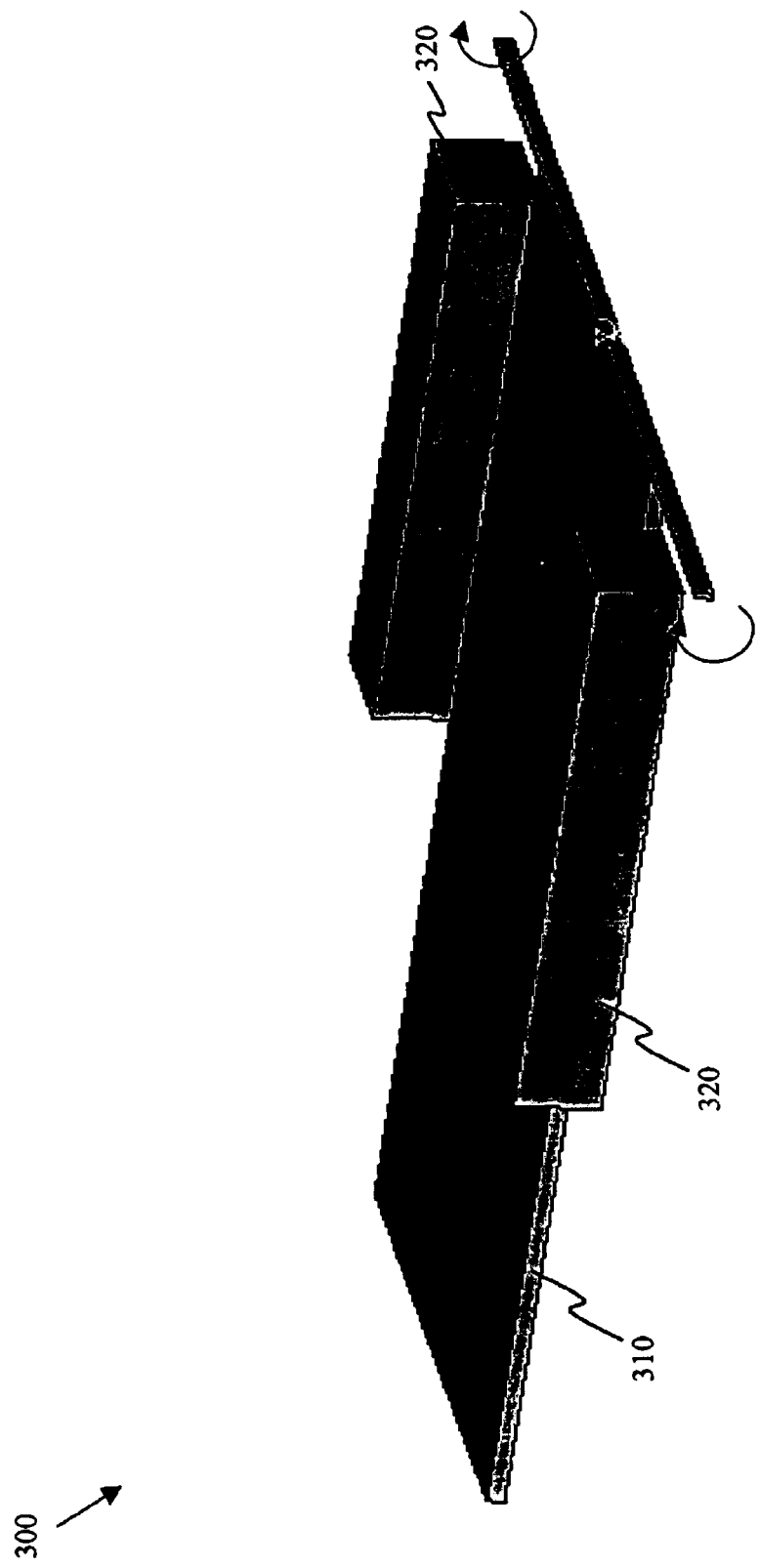
FIG. 3 illustrates an alternative embodiment MEMS device, as compared to the MEMS device illustrated in FIG. 1.

Turning to FIG. 3, illustrated is an alternative embodiment MEMS device 300, as compared to the MEMS device 100 illustrated in FIG. 1. The MEMS device 300 includes a pair of reflective element actuators 320 located on opposing sides of the reflective element 310. In a situation wherein one reflective element actuator 320 is located on a side of the reflective element 310, not on the tip 140 as illustrated in FIG. 1, it is generally desired to have an opposing reflective element actuator 320 located on the other side, such as illustrated in FIG. 3. Without an opposing reflective element actuator 320, the reflective element 310 may undesirably twist in a direction contrary to the rotation direction shown in FIG. 3.

Figure 4:
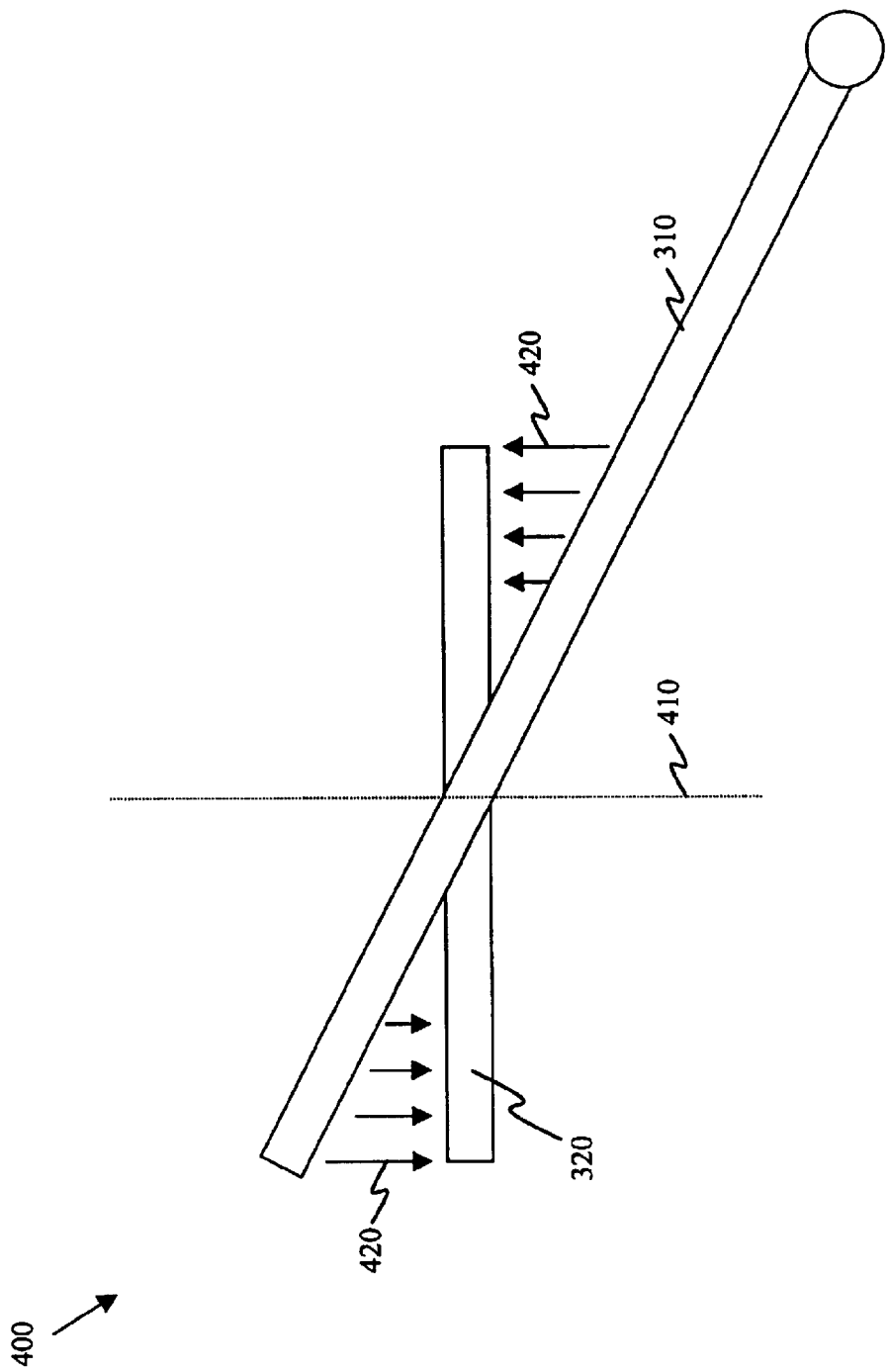
FIG. 4 illustrates an embodiment showing forces that may be placed upon the reflective element by the reflective element actuator.

As shown in FIG. 4, when a voltage differential is applied between the reflective element actuators 320 and the reflective element 310, the attractive electrostatic forces pull the reflective element 310 toward the reflective element actuators 320. Once the reflective element 310 approaches a center 410 of the activated reflective element actuators 320, electrostatic forces 420 balance out. The electrostatic forces 420 pull the reflective element 310 down on the left-hand side, but pull it up on the right-hand side. Equilibrium is achieved when the opposing electrostatic forces 420 and the mechanical restoring forces, e.g., provided by a torsional spring, all balance out. The equilibrium point is very close to the center 410 of the reflective element actuators 320, and hence a desired tilt angle can be determined very precisely by the position of the reflective element actuators 320, and the initial vertical spacing between the reflective element actuators 320 and the reflective element 310.

Figure 5:
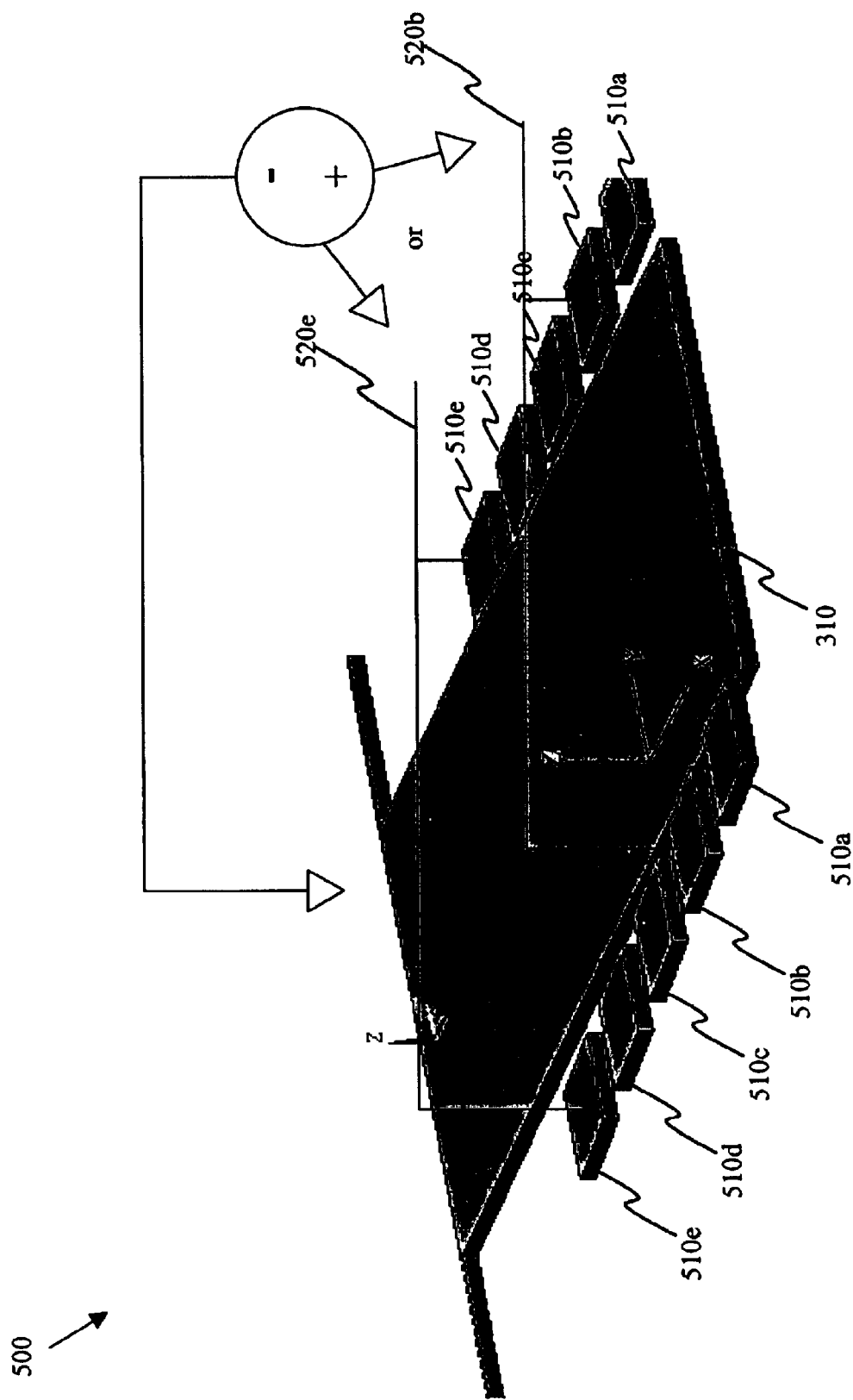
FIG. 5 illustrates an alternative embodiment of the invention, wherein a plurality of pairs of reflective element actuators are located on opposing sides of the reflective element.

Turning to FIG. 5, illustrated is an alternative embodiment of the invention, wherein a plurality of pairs of reflective element actuators 510a–e are located on opposing sides of the reflective element 310. In the embodiment illustrated in FIG. 5, each of the pairs of reflective element actuators 510a–e are positioned at differing locations adjacent the path of motion of the reflective element 310. Thus, the reflective element 310 may be completely rotated about the Y-axis without physically encountering the reflective element actuators 510a–e.

In the embodiment illustrated in FIG. 5, the MEMS device 500 could be operated by providing a first bias voltage between the reflective element 310 and a first reflective element actuator, for example using the actuator labeled 510b. Then, a second bias voltage may be provided between the reflective element 310 and a second reflective element actuator, for example the actuator labeled 510e. When the first bias voltage is being applied the reflective element 310 will move to a first location, and likewise, when the second bias voltage is being applied the reflective element will move to a second location. As illustrated, more than two reflective element actuators may be used. Also, each reflective element actuator may comprise a pair of actuators located on opposing sides of the reflective element 310.

The embodiment illustrated in FIG. 5 may be considered a digital control of the angle of tilt of the reflective element 310. In FIG. 5, each of the pairs of reflective element actuators may be connected to an independent fixed voltage source 520a–e. This is dissimilar from the embodiments illustrated in FIGS. 1 and 3, wherein the reflective element actuators 130, 320, respectively, may be connected to a variable voltage source, wherein the voltage fluctuates, depending on a desired tilt angle. As illustrated, the fixed voltage source 520 may be switched between the plurality of reflective element actuators 510, possibly providing a more accurate actuation of the reflective element 310. While only 5 pairs of reflective element actuators 510a–e have been shown, one skilled in the art understands that the number may vary and still stay within the scope of the present invention.

Figure 6:
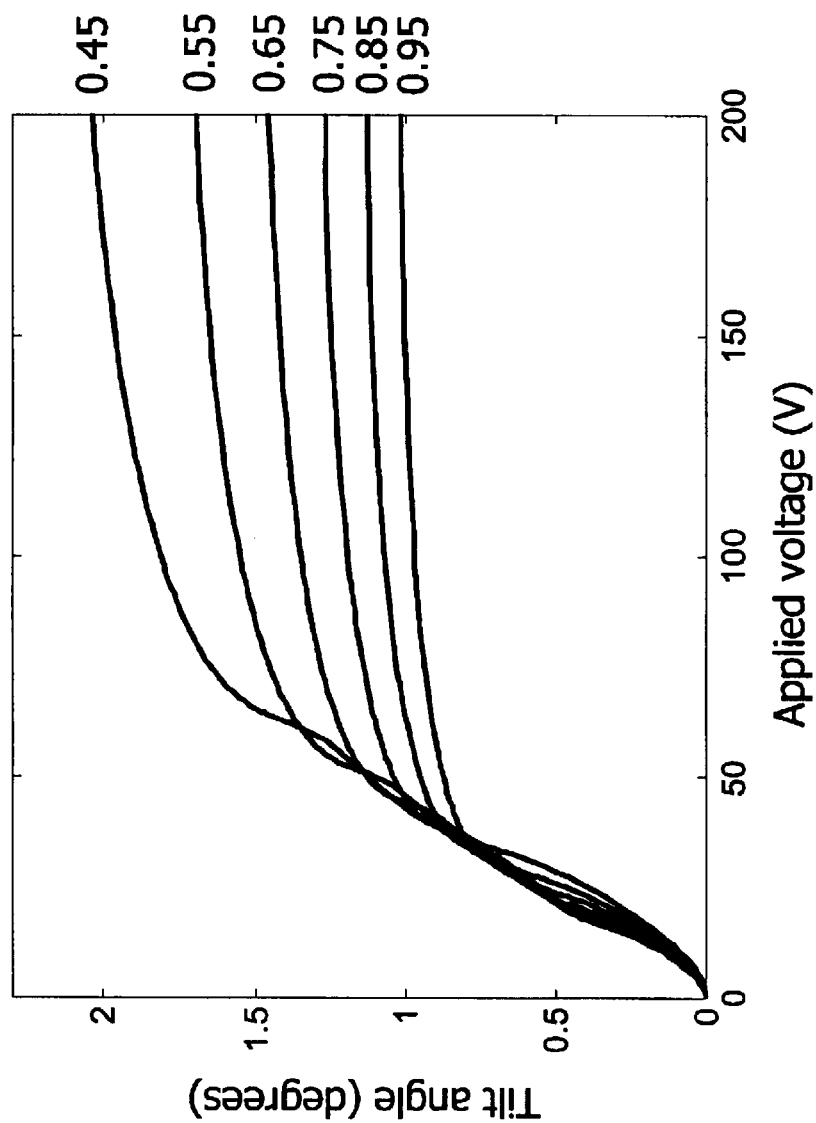
FIG. 6 illustrates a graph illustrating tilt angle as a function of voltage applied between the reflective element and pairs of reflective element actuators depicted in FIG. 5.

Turning to FIG. 6, shown is a graph 600 illustrating tilt angle as a function of voltage applied between the reflective element and the pairs of reflective element actuators 510 depicted in FIG. 5. The numbers on the right-hand-side of the graph 600 indicate the position of the reflective element actuators along the length of the reflective element (as a fraction of length), with 0.95 being at the tip and 0.45 near the middle of the reflective element. The variation in tilt angle in the saturation condition depends on the stability of the voltage, the stiffness of the torsional tethers, and size of the reflective element 310. As can be noticed in FIG. 6, saturation is more difficult to achieve at higher angles because the mechanical restoring torque is larger. At the 0.45 location, a change in torsional stiffness of about 10% induces a change in tilt angle of only about 0.01° at about 200V. At the 0.95 location, a similar change in torsional stiffness induces a change in tilt angle of only about 0.002°.

The digital control may be highly desirable because it offers the possibility of eliminating the training required to characterize the tilt angles as a function of voltage. For single axis devices which only need to tilt a few distinct angles, such as in small cross connects or wavelength multiplexers, this may provide significant cost and time savings during production. While the digital control has been illustrated with respect to reflective element actuators located on opposing sides of the reflective element 310, one skilled in the art understands that such a design could be used with all embodiments, including the single reflective element actuator located at the tip of the reflective element.

Figure 7:
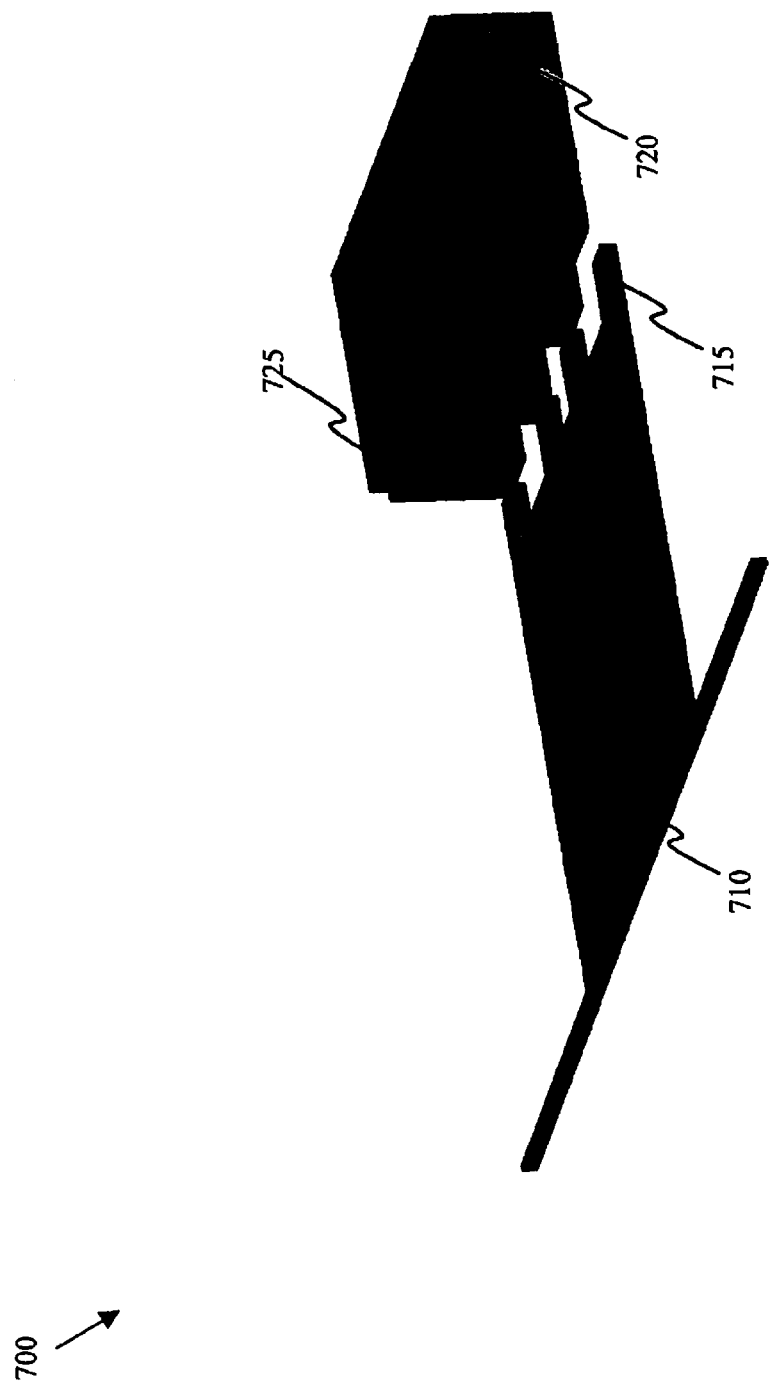
FIG. 7 illustrates another embodiment of the MEMS device, wherein the reflective element includes reflective element fingers and the reflective element actuator includes actuator fingers.

Turning to FIG. 7, illustrated is another embodiment of the MEMS device, wherein a reflective element 710 includes reflective element fingers 715, and a reflective element actuator 720 includes actuator fingers 725. As illustrated, the element fingers 715 are positioned to interdigitate between the actuator fingers 725. Using the element fingers 715 and the actuation fingers 725, allows one to take advantage of the increase surface, area of the reflective element actuators 720. As a result, an increased actuation force may be produced using a reduced applied voltage. With this embodiment, however, good alignment between the element fingers 715 and the actuation fingers 725 may be required to maintain lateral symmetry, otherwise lateral forces can be substantial with fingers engaged.

Figure 8:
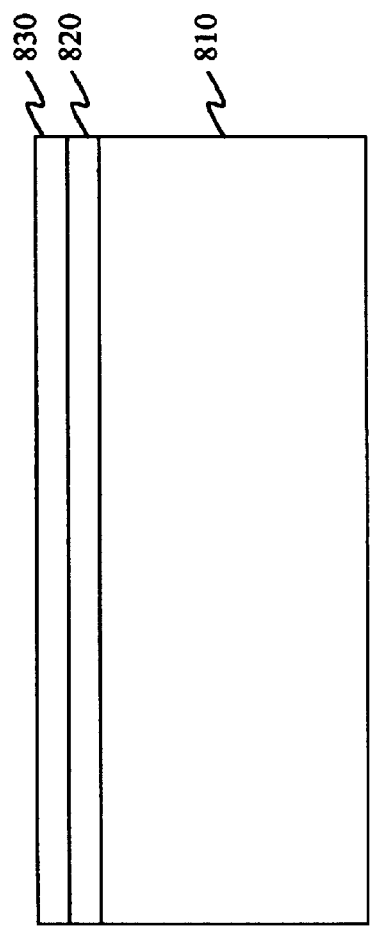
FIGS. 8–14 illustrate detailed manufacturing steps instructing how one might, in a preferred embodiment, manufacture an embodiment of the MEMS device.

Turning to FIGS. 8–14, with continued reference to FIGS. 1 and 3, illustrated are detailed manufacturing steps instructing how one might, in an exemplary embodiment, manufacture an embodiment of the MEMS device. Turning to FIG. 8, illustrated is a cross-sectional view of a partially completed MEMS device 800, including a bulk layer of silicon 810 have a spacer layer 820 located thereover. The spacer layer 820 may comprise different types of insulative layers, however, in an exemplary embodiment is a convention tetraethylorthosilicate (TEOS) layer. Formed over the spacer layer 820 is a layer of silicon, which will eventually form part of the reflective element 310.

Figure 9:
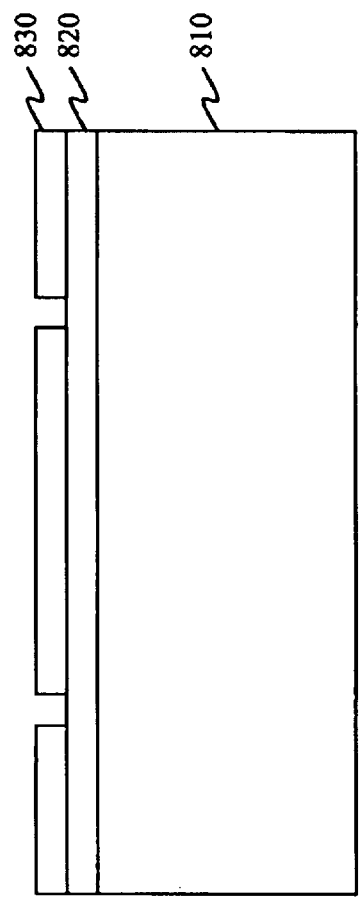

Turning to FIG. 9, illustrated is the partially completed MEMS device 800 illustrated in FIG. 8, after a first masking and etching step. In the manufacturing step shown in FIG. 9, the silicon layer 830 is masked and etched in the shape of a desired reflective element. One skilled in the art understands the conventional methods that might be used to mask and etch the silicon layer 830.

Figure 10:
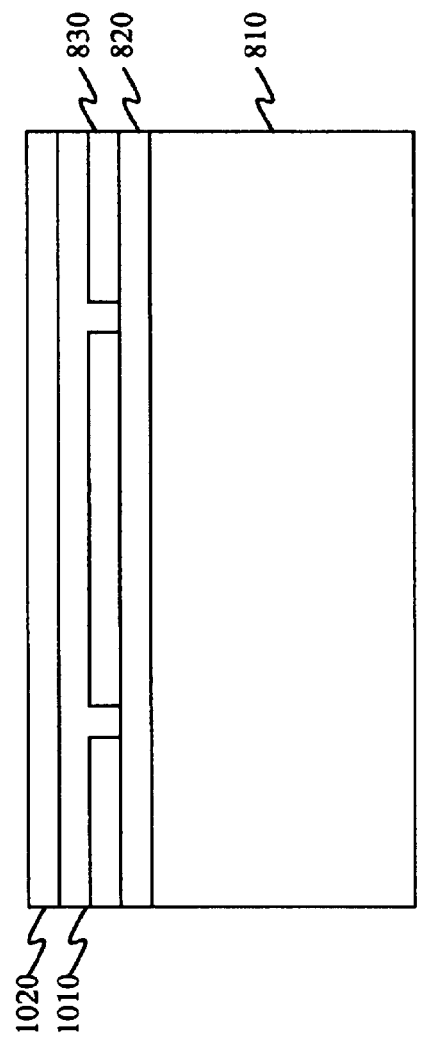

Turning to FIG. 10, illustrated is the partially completed MEMS device 800 illustrated in FIG. 9, after forming an additional spacer layer 1010 thereover. As illustrated, subsequent to forming the additional spacer layer 1010, a thick conductive layer 1020 may be formed. The thick conductive layer 1020 will eventually form part of the reflective element actuators 130, 320.

In an alternative embodiment, the element actuators 130, 320, could be formed using an electroplating process. In such a process, a seed layer could be formed on the entire wafer, followed by a photolithographic process leaving areas where the element actuator 130, 320, are desired, being unprotected. The unprotected areas could then be electroplated using the seed layer, thus providing the element actuators 130, 320. Following the electroplating, it is known in the art to remove the surface roughness caused by the electroplating, using a polishing step.

Figure 11:
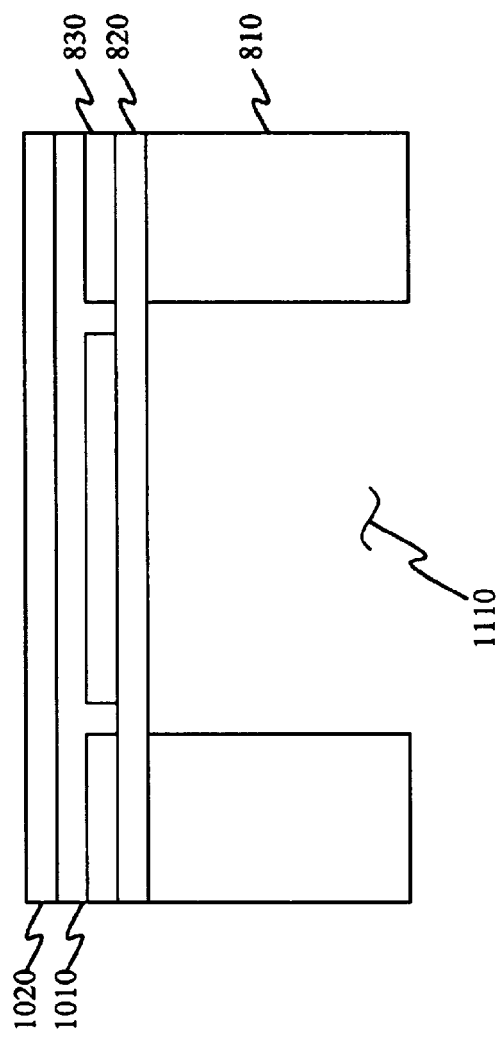

Turning to FIG. 11, illustrated is the partially completed MEMS device 800 illustrated in FIG. 10, after a second masking and etching step. As illustrated, the bulk layer of silicon 810 is etched, providing a cavity 1110 therein. Conventional processes may be used to form the cavity 1110.

Figure 12:
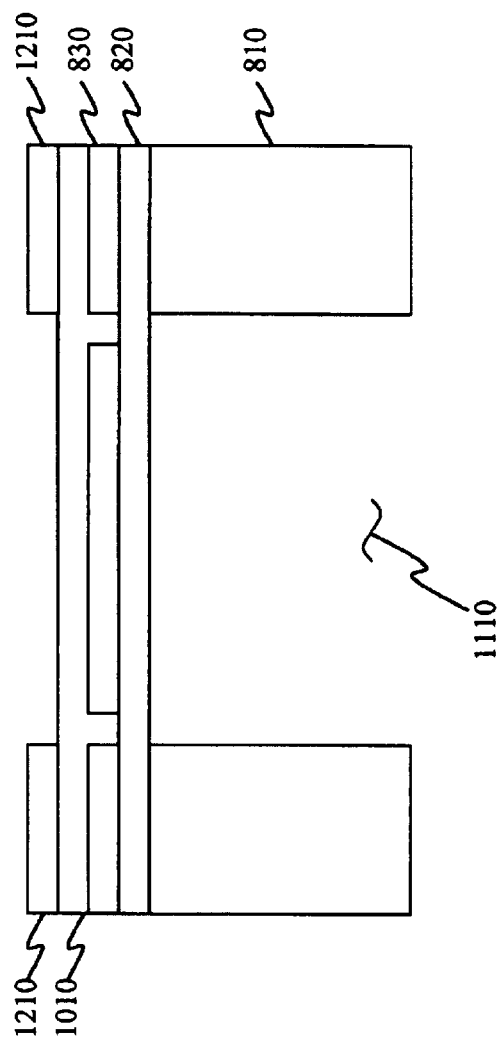

Turning to FIG. 12, illustrated is the partially completed MEMS device 800 illustrated in FIG. 11, after a third masking and etching step. The third masking and etching step produces reflective element actuators 1210.

Figure 13:
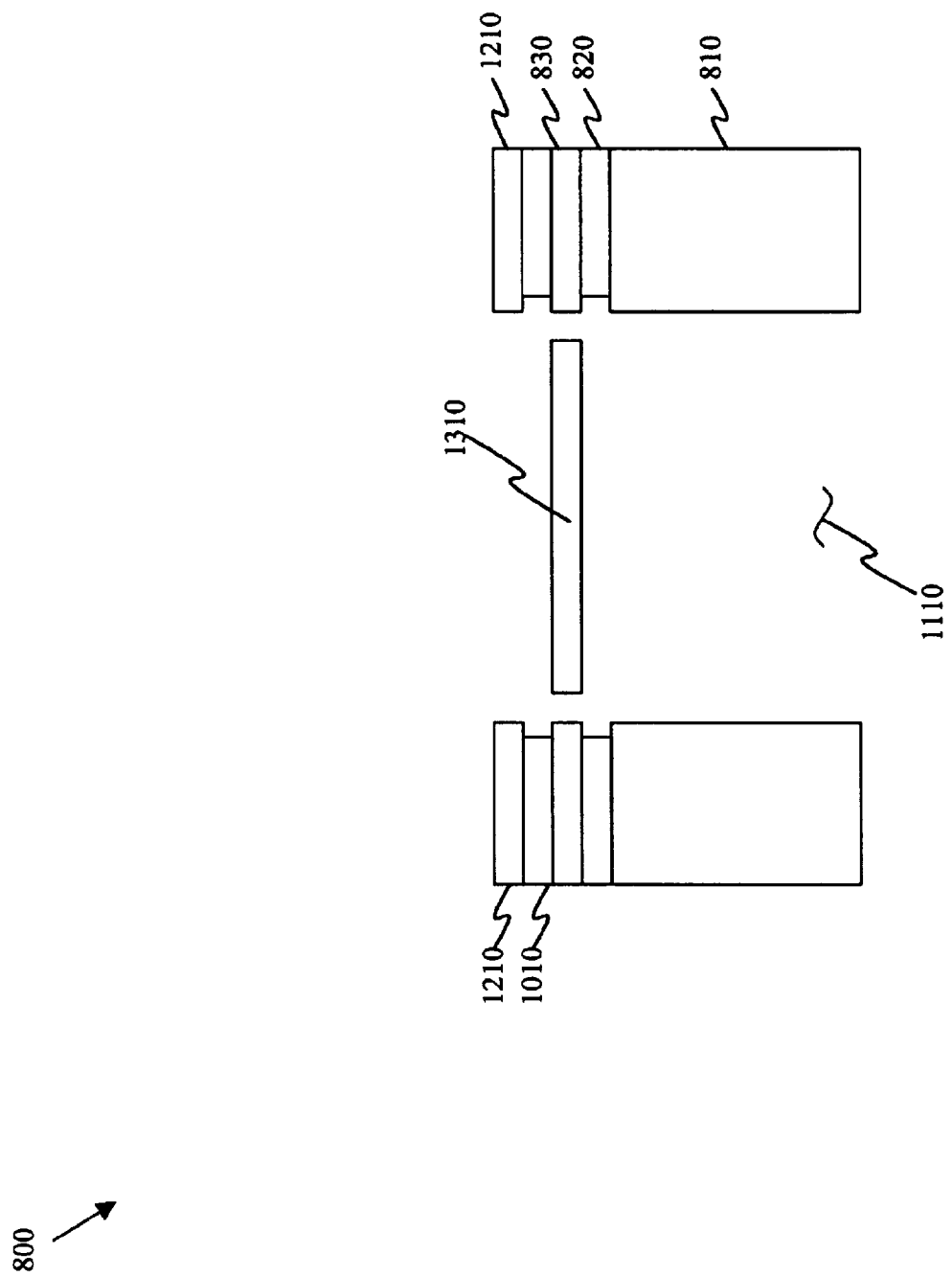

Turning to FIG. 13, illustrated is the partially completed MEMS device 800 illustrated in FIG. 12, after removing the exposed spacer layers 820, 1010. In an exemplary embodiment, this may be performed using a traditional hydrofluoric (HF) etch. It should be noted, however, that other techniques may also be used to remove the exposed layer 820, 1010. A substrate 1310, which will form the reflective element in a subsequent step, is suspended in the middle of the MEMS device 800 by an end that is attached to the MEMS device 800, as further illustrated in FIG. 15, which is discussed below.

Figure 14:
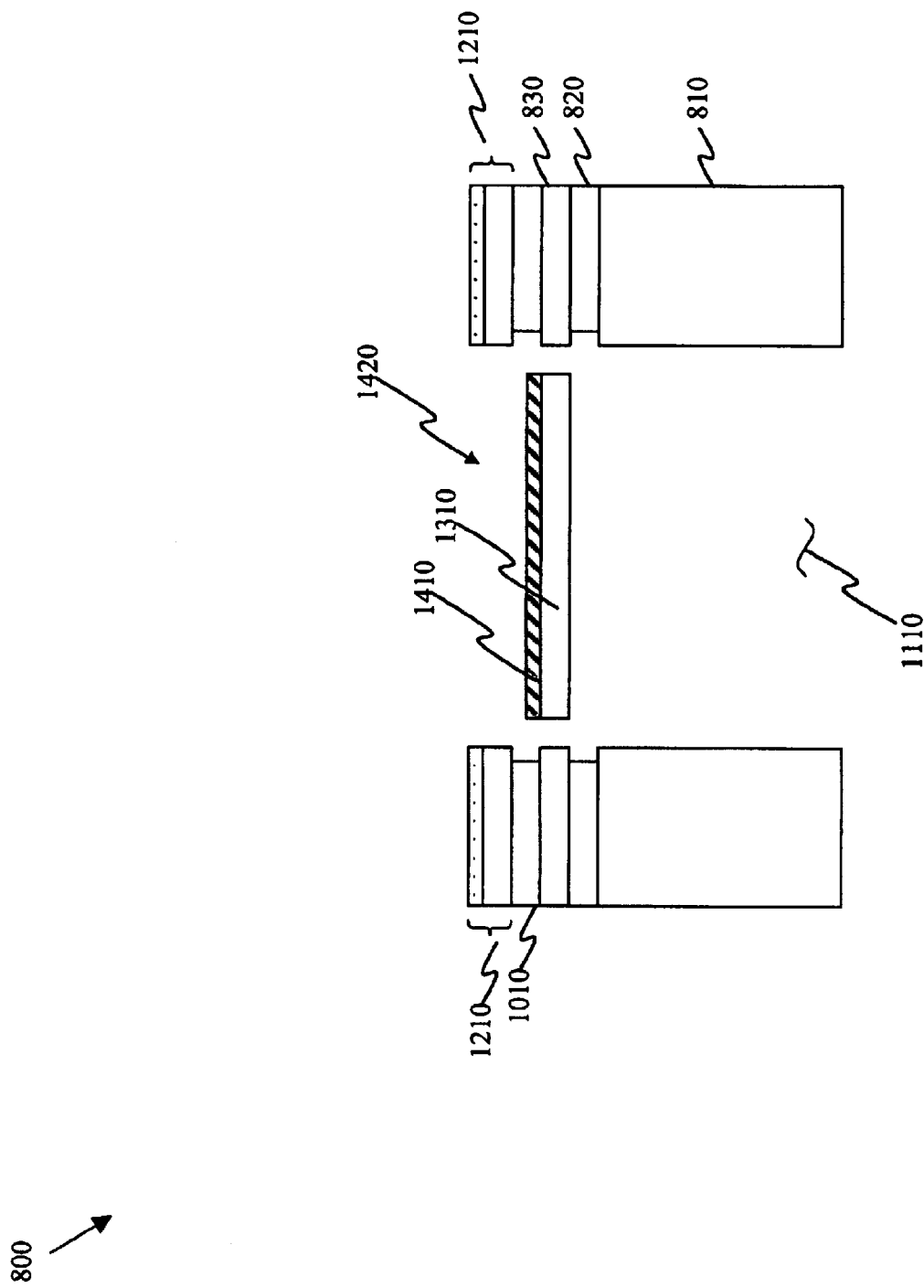

Turning to FIG. 14, illustrated is the partially completed MEMS device 800 illustrated in FIG. 13 after forming metallized films 1410 over the substrate 1310, completing the reflective element 1420. Also completed in the steps shown in FIG. 14, are the reflective element actuators 1210. The embodiment of the fabrication process discussed in FIGS. 8–14 is relatively straight forward and cost efficient. Moreover, the fabrication process discussed above may be implemented using traditional fabrication processes and may be limited to only three photolithographic masking steps, thereby reducing manufacturing costs.

Figure 15:
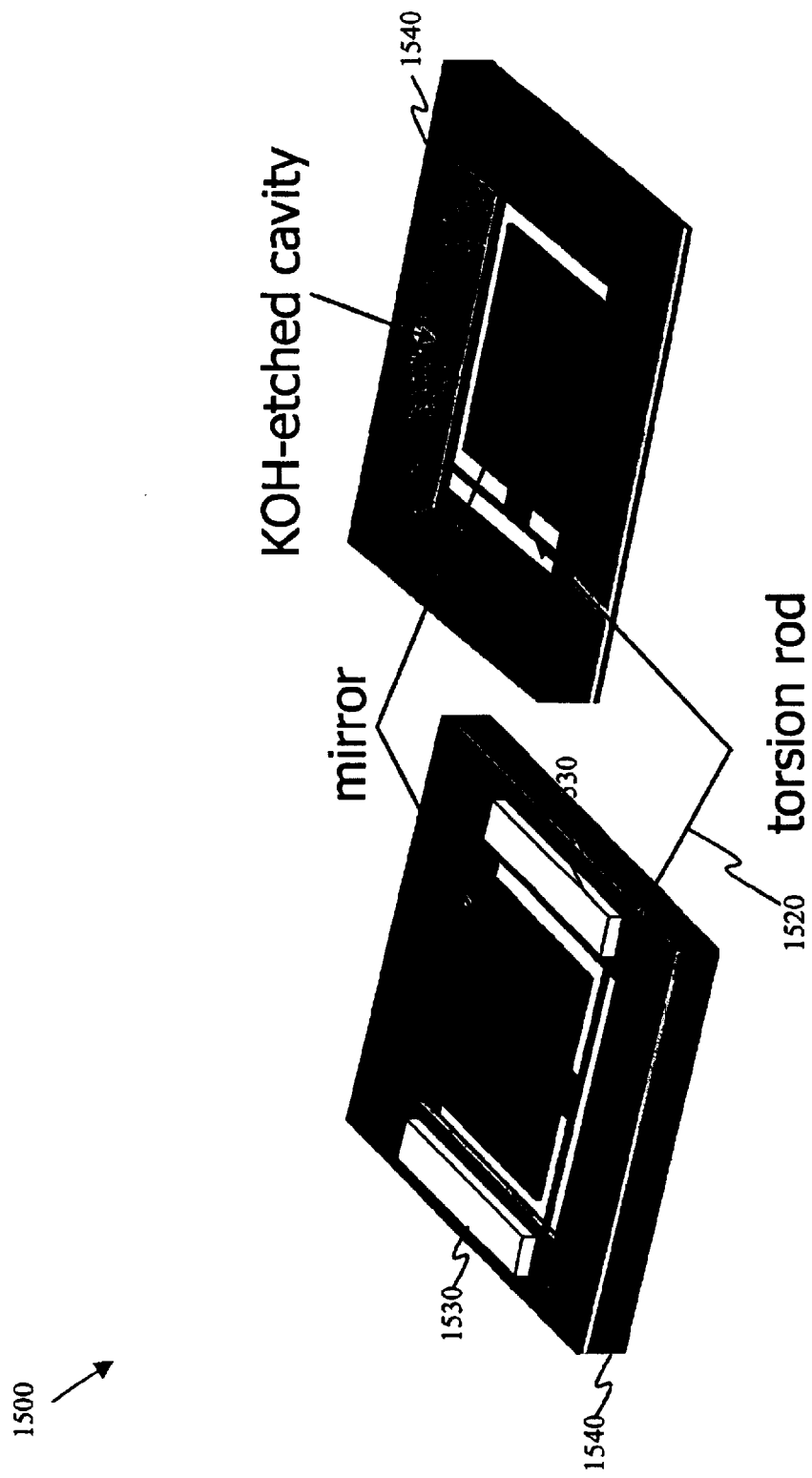
FIG. 15 illustrates a completed MEMS device in accordance with the principles of the present invention, which may have been manufactured using the manufacturing steps shown in FIGS. 8–14.

Turning briefly to FIG. 15, illustrated is a 3-dimensional representation of one embodiment of the completed MEMS device 1500. The completed MEMS device 1500 includes a reflective element 1510, a torsional rod 1520, reflective element actuators 1530, and a bulk silicon substrate 1540.

Figure 16:
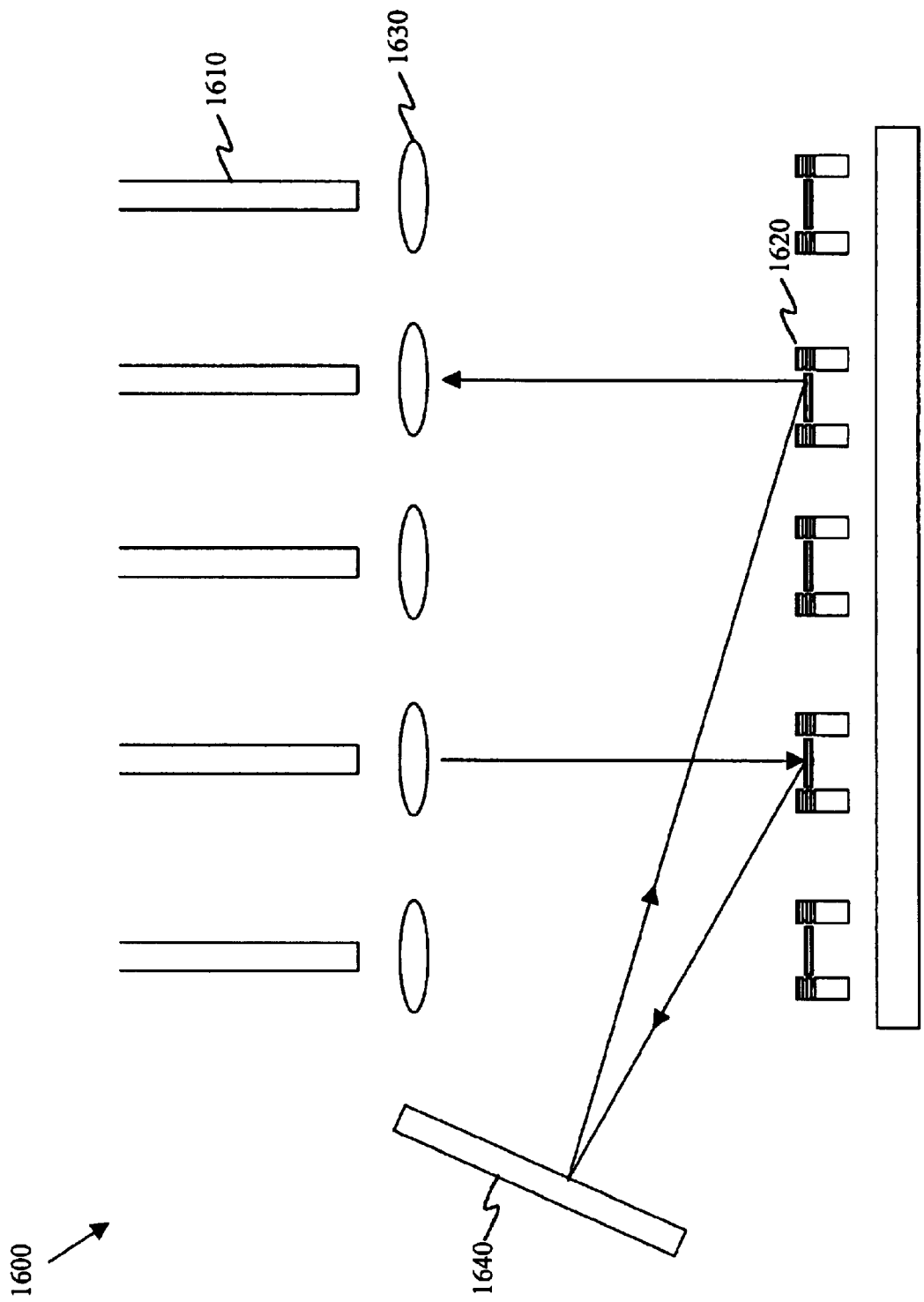
FIG. 16 illustrates an optical communications system, including a MEMS device and input/output fiber bundles.

Turning to FIG. 16, illustrated is an optical communications system 1600. In the embodiment shown in FIG. 16, the optical communications system 1600 includes input/output fiber bundles 1610, the MEMS device 1620 illustrated in FIG. 14, imaging lenses 1630 interposed between the input/output fiber bundles 1610 and the MEMS device 1620, and a reflector 1640. The optical communications system 1600 represents an optical cross-connect, which is one environment where the MEMS device 1620 may be used.

Although the present invention has been described in detail, those skilled in the art should understand that they can make various changes, substitutions and alterations herein without departing from the spirit and scope of the invention in its broadest form.

What is claimed is:

1. A micro-electrical-mechanical system device, comprising:
   a reflective element; and
   a plurality of pairs of reflective element actuators located on opposing sides of the reflective element, wherein each pair of the plurality is located at differing distances outside and adjacent a path of motion of the reflective element and are configured to move the reflective element different amounts in a same direction.

2. The micro-electrical-mechanical system device as recited in claim 1 wherein each of the pairs is connected to an independent fixed voltage source.

3. The micro=electrical-mechanical system device as recited in claim 1 wherein the plurality of pairs of reflective element actuators are located adjacent a tip of the reflective element.

4. The micro-electrical-mechanical system device as recited in claim 1 wherein the reflective element includes element fungers, the plurality of pairs of reflective element actuators include actuator fingers and the element fingers are positioned to interdigitate between the actuator fingers during actuation of the reflective element.

5. The micro-electrical-mechanical system device as recited in claim 1 wherein a lateral gap between the reflective element and the plurality of pairs of reflective element actuators ranges from about 2 $\mu$m to about 6 $\mu$m.

6. The micro-electrical-mechanical system device as recited in claim 1 wherein the plurality of pairs of reflective element actuators may have a height up to about 15 $\mu$m.

7. The micro-electrical-mechanical system device as recited in claim 1 wherein the plurality of pairs of reflective element actuators are located above a bulk silicon substrate with spacers.

8. The micro-electrical-mechanical system device as recited in claim 1 wherein the reflective element is coupled to a torsional rod.

9. The micro-electrical-mechanical system device as recited in claim 1 wherein the reflective element may rotate about multiple axes.

10. A method of manufacturing a micro-electrical-mechanical system device, comprising the steps of:
    forming a reflective element; and
    forming a plurality of pairs of reflective element actuators on opposing sides of the reflective element, wherein each pair of the plurality is located at differing distances outside and adjacent a path of motion of the reflective element and are configured to move the reflective element different amounts in a same direction.

11. The method as recited in claim 10 further including the step of connecting each of the pairs to an independent fixed voltage source.

12. The method as recited in claim 10 wherein the step of forming the reflective element includes the step of forming the reflective element having element fingers and the step of forming the plurality of pairs of reflective element actuators includes the step of forming the plurality of pairs of reflective element actuators having actuator fingers, wherein the element fingers are positioned to interdigitate between the actuator fingers during actuation of the reflective element.

13. The method as recited in claim 10 wherein the step of forming a reflective element includes the step of forming a reflective element having a lateral gap ranging from about 2 $\mu$m to about 6 $\mu$m between the reflective element and the plurality of pairs of reflective element actuators.

14. The method as recited in claim 10 wherein the step of forming the plurality of pairs of reflective element actuators includes the step of forming the plurality of pairs of reflective element actuators having a height up to about 15 $\mu$m.

15. The method as recited in claim 10 wherein the step of forming the plurality of pairs of reflective element actuators includes the step of forming the plurality of pairs of reflective element actuators above a bulk silicon substrate with spacers.

16. The method as recited in claim 10 wherein the step of forming the reflective element and forming the plurality of pairs of reflective element actuators includes:
    patterning a reflective element substrate located over a bulk silicon substrate to the shape of the reflective element,
    forming an insulator,
    forming a polysilicon layer over the insulator,
    etching a back cavity in the bulk silicon substrate,
    patterning the polysilicon layer to form the plurality of pairs of reflective element actuators,
    removing undesired portions using an etch, and
    metallizing the reflective element and the plurality of pairs of reflective element actuators.

17. The method as recited in claim 16 wherein the step of forming the reflective element and the step of forming the plurality of pairs of reflective element actuators includes the step of forming the reflective element and the step of forming the plurality of pairs of reflective element actuators using three or less masking steps.

18. An optical communications system, comprising:
    input/output fiber bundles:
    a reflective element positioned to receive radiation from the input/output fiber bundles; and
    a plurality of pairs of reflective element actuators located on opposing sides of the reflective element, wherein each pair of the plurality is located at differing distances outside and adjacent a path of motion of the reflective element and are configured to move the reflective element different amounts in a same direction.

19. The optical communications system as recited in claim 18 further including:

imaging lenses interposed between the input/output fiber bundles and the micro-electrical-mechanical system device, and a reflector configured to reflect the radiation exiting or entering the input/output fiber bundles.

20. A micro-electrical-mechanincal system device, comprising:

a reflective means for reflecting an amount of radiation; and an actuation means located adjacent a perimeter of the reflective means and outside a path of motion of the reflective means for positioning the reflective means, wherein the actuation means includes a plurality of pairs of actuator means located on opposing sides of the reflective means, wherein each pair of the plurality is located at differing distances along the path of motion and are configured to move the reflective element different amounts in a same direction.

21. The micro-electrical-mechanical system device as recited in claim 20 wherein each of the pairs is connected to an independent fixed voltage means.

22. The micro-electrical-mechanical system device as recited in claim 20 wherein the plurality of pairs of actuator means are positioned adjacent a tip of the reflective means.

23. The micro-electrical-mechanical system device as recited in claim 20 wherein the reflective means includes element fingers, the plurality of pairs of actuator means include actuator fingers and the element fingers are positioned to interdigitate between the actuator fingers during actuation of the reflective means.

24. The micro-electrical-mechanical system device as recited in claim 20 wherein a lateral gap between the reflective means and the plurality of pairs of actuator means ranges from about 2 $\mu$m to about 6 $\mu$m.

25. The micro-electrical-mechanical system device as recited in claim 20 wherein the plurality of pairs of actuator means have a height up to about 15 $\mu$m.

26. The micro-electrical-mechanical system device as recited in claim 20 wherein the plurality of pairs of actuator means are located above a bulk silicon substrate with spacers.

27. The micro-electrical-mechanical system device as recited in claim 20 wherein the reflective means is coupled to a torsional rod.

28. The micro-electrical-mechanical system device as recited in claim 20 wherein the reflective means may rotate about multiple axes.

* * * * *